United States Patent
Meier et al.

(10) Patent No.: US 7,381,256 B2
(45) Date of Patent: Jun. 3, 2008

(54) MIXTURES OF FIBER-REACTIVE AZO DYES, THEIR PRODUCTION AND THEIR USE

(75) Inventors: Stefan Meier, Frankfurt (DE); Uwe Reiher, Hofheim (DE); Werner Hubert Russ, Flörsheim-Wicker (DE); Christian Schumacher, Kelkheim (DE)

(73) Assignee: Dystar Textilfarben GmbH & Co. Deutschland KG (DE)

( * ) Notice: Subject to any disclaimer, the term of this patent is extended or adjusted under 35 U.S.C. 154(b) by 44 days.

(21) Appl. No.: 11/547,734

(22) PCT Filed: Apr. 9, 2005

(86) PCT No.: PCT/EP2005/003752

§ 371 (c)(1),
(2), (4) Date: Oct. 25, 2006

(87) PCT Pub. No.: WO2005/100485

PCT Pub. Date: Oct. 27, 2005

(65) Prior Publication Data

US 2007/0209540 A1 Sep. 13, 2007

(30) Foreign Application Priority Data

Apr. 14, 2004 (DE) ............ 10 2004 017 977

(51) Int. Cl.
*C09D 11/00* (2006.01)
*C09B 62/085* (2006.01)
*C09B 67/22* (2006.01)

(52) U.S. Cl. .................. 106/31.48; 8/549; 8/641
(58) Field of Classification Search .......... 106/31.48; 8/543, 549, 641
See application file for complete search history.

(56) References Cited

U.S. PATENT DOCUMENTS

| | | | |
|---|---|---|---|
| 4,378,313 A | | 3/1983 | Kayane et al. |
| 5,308,362 A | * | 5/1994 | Kayane et al. .............. 8/641 |
| 5,456,728 A | * | 10/1995 | Schwarz et al. ............ 8/549 |
| 5,516,897 A | * | 5/1996 | Lamble et al. ............. 8/549 |
| 5,993,492 A | | 11/1999 | Reiher |
| 6,168,636 B1 | | 1/2001 | Gröbel et al. |
| 6,368,362 B1 | * | 4/2002 | Pedemonte et al. ......... 8/549 |
| 7,015,335 B2 | | 3/2006 | Dannheim |
| 2006/0117500 A1 | * | 6/2006 | Meier et al. ............... 8/527 |

FOREIGN PATENT DOCUMENTS

| | | |
|---|---|---|
| DE | 29 27 102 | 1/1980 |
| DE | 198 51 497 | 5/2000 |
| EP | 0 021 105 | 1/1981 |
| EP | 0 056 975 | 8/1982 |
| EP | 0 644 240 | 3/1995 |
| EP | 1 000 982 | 5/2000 |
| GB | 2 026 527 | 2/1980 |
| JP | 07-179784 | 7/1995 |
| JP | 10-204314 | 8/1998 |
| WO | WO-02/051944 | 7/2002 |

* cited by examiner

*Primary Examiner*—Helene Klemanski
(74) *Attorney, Agent, or Firm*—Connolly Bove Lodge & Hutz LLP

(57) ABSTRACT

The present invention relates to a dye mixture which comprises at least one dye of the general formula (I)

$$(MO_3S)_m-D^1-N=N-\text{[aryl]}(R^1)-NH-\text{[triazine]}(Cl)-NH-W^1-SO_2-Y^1 \quad (I)$$

with $H-N(R^3)$ and $R^2-C(=O)-NH-$ substituents and at least one dye of the general formula (II)

$$(MO_3S)_n-D^2-N=N-\text{[aryl]}(R^4)-NH-\text{[triazine]}(F)-NH-W^2-SO_2-Y^2 \quad (II)$$

with $H-N(R^6)$ and $R^5-C(=O)-NH-$ substituents in which $D^1$, $D^2$, $W^1$, $W^2$, $Y^1$, $Y^2$, $R^1$ to $R^6$, M, m and n are defined as indicated in claim 1, to processes for preparing them, to their use, and to inks comprising them for digital printing.

13 Claims, No Drawings

MIXTURES OF FIBER-REACTIVE AZO DYES, THEIR PRODUCTION AND THEIR USE

RELATED APPLICATIONS

This application is a national stage application (under 35 U.S.C. 371) of PCT/EP2005/003752 filed Apr. 9, 2005, which claims benefit of German application 10 2004 017 977.8 filed Apr. 14, 2004.

Mixtures of fiber-reactive azo dyes, their preparation and use

The present invention is situated within the field of reactive dyes and relates to dye mixtures suitable for dyeing and printing fiber materials containing hydroxyl or amide groups.

Numerous reactive dyes and reactive-dye mixtures for dyeing and printing the aforementioned fiber materials have been described in the literature, one example being DE 198 51 497 A1. These conventional dyes, however, do not go far enough to satisfy the very latest exacting requirements in respect of the fastness properties of the dyed or printed products.

With the present invention dye mixtures have now been found whose dyeings, in comparison to the dye mixtures described in DE 198 51 497 A1, surprisingly possess much better fastness properties, the chlorine fastness deserving particular emphasis. In addition the new dye mixtures afford dyeings having a color yield which is much higher than the average sum of the color yields of the dyeings of the individual dyes in the dye mixture. This produces improved build-up characteristics on the part of the mixtures of the invention as compared with the individual dyes in the mixture.

The present invention provides dye mixtures which comprise at least one dye of the general formula (I)

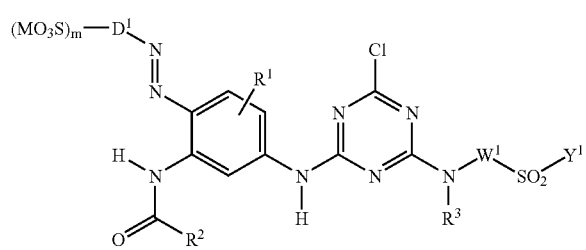

(I)

and at least one dye of the general formula (II)

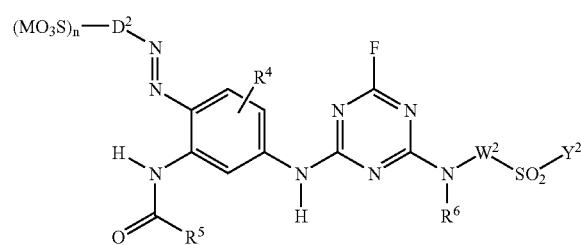

(II)

in which $D^1$ and $D^2$ independently of one another are the radical of benzene or of naphthalene;

m and n independently of one another are the number 1, 2 or 3;

$W^1$ and $W^2$ independently of one another are $(C_1$-$C_4)$-alkylene, $(C_3$-$C_6)$-alkylene which is interrupted by 1 or 2 hetero-groups from the group of formulae —O— and —NH—, or are a group alk-phen, phen-alk or phen, in which alk is methylene, ethylene or n-propylene and phen is phenylene or phenylene substituted by 1 or 2 substituents from the group sulfo, $(C_1$-$C_4)$-alkyl and $(C_1$-$C_4)$-alkoxy;

$Y^1$ and $Y^2$ independently of one another are vinyl or ethyl substituted in β position by an alkali-eliminable substituent;

$R^1$ and $R^4$ independently of one another are hydrogen, $(C_1$-$C_4)$-alkyl and $(C_1$-$C_4)$-alkoxy or sulfo;

$R^2$ and $R^5$ independently of one another are amino, $(C^1$-$C_4)$-alkyl or $(C_1$-$C_4)$-alkyl substituted by carboxyl, sulfo or a group —$SO_2$—$Y^3$ in which $Y^3$ has one of the definitions stated for $Y^1$;

$R^3$ and $R^6$ independently of one another are hydrogen, $(C_1$-$C_4)$-alkyl, phenyl or phenyl substituted by 1 or 2 substituents from the group sulfo, $(C_1$-$C_4)$-alkyl and $(C_1$-$C_4)$-alkoxy; and M is hydrogen, an alkali metal or the equivalent of an alkaline earth metal.

Aforementioned $(C_1$-$C_4)$-alkyl groups can be straight-chain or branched and are for example methyl, ethyl, n-propyl, isopropyl, n-butyl, isobutyl, sec-butyl or tert-butyl. Similar comments apply to $(C_1$-$C_4)$-alkoxy groups, which in particular are methoxy or ethoxy.

$(C_3$-$C_6)$-alkylene which is interrupted by 1 or 2 hetero-groups from the group of formulae —O— and —NH— is for example groups of the formulae —$(CH_2)_x$—O—$(CH_2)_y$—, —$(CH_2)_x$—NH—$(CH_2)_y$—, —$(CH_2)_u$—O—$(CH_2)_v$—O—$(CH_2)_w$— or —$(CH_2)_u$—NH—$(CH_2)_v$—NH—$(CH_2)_w$—, where the sum x+y or u+v+w is a number from 3 to 6 but where none of the indices x, y, u, v and w can be 0. Preference is given to the group of the formula —$(CH_2)_2$—O—$(CH_2)_2$—. Alkali-eliminable substituents which substitute in β position an ethyl group standing for $Y^1$, $Y^2$ or $Y^3$ are for example chloro, sulfato, thiosulfato, phosphato and $(C_2$-$C_5)$-alkanoyloxy, such as acetyloxy for example, and sulfobenzoyloxy.

The groups "sulfo", "thiosulfato", "carboxyl", "phosphato" and "sulfato" include not only their acid form but also their salt form. Accordingly sulfo groups are groups of the general formula —$SO_3M$, thiosulfato groups are groups of the general formula —S—$SO_3M$, carboxyl groups are groups of the general formula —COOM, phosphato groups are groups of the general formula —$OPO_3M_2$, and sulfato groups are groups of the general formula —$OSO_3M$, M having one of the abovementioned definitions.

Alkali metals standing for M are, in particular, sodium, potassium and lithium. Alkaline earth metals whose equivalent can stand for M are, in particular, calcium and magnesium.

Preferred dye mixtures of the invention comprise dyes of the general formulae (I) and (II) in which $D^1$ and $D^2$ independently of one another are the radical of benzene or of naphthalene;

m and n independently of one another are the number 1, 2 or 3;

$W^1$ and $W^2$ independently of one another are ethylene, n-propylene, —$(CH_2)_2$—O—$(CH_2)_2$—, —$CH_2$-phenylene, —CH$_2$—CH$_2$-phenylene, phenylene-CH$_2$—, phenylene-CH$_2$—CH$_2$, phenylene or phenylene substituted by 1 or 2 substituents from the group sulfo, methyl, ethyl, methoxy and ethoxy;

$Y^1$ and $Y^2$ independently of one another are vinyl, β-chloroethyl or β-sulfatoethyl;

$R^1$ and $R^4$ independently of one another are hydrogen, methyl, methoxy or sulfo and are positioned para to the group —NH—CO—$R^2$ or —NH—CO—$R^5$, respectively;

$R^2$ and $R^5$ independently of one another are methyl or amino;

$R^3$ and $R^6$ independently of one another are hydrogen, ($C_1$-$C_4$)-alkyl or phenyl; and M is hydrogen, sodium, potassium or lithium.

Particularly preferred dye mixtures of the invention comprise dyes of the general formulae (I) and (II) in which the group $(MO_3S)_m$-$D^1$- or $(MO_3S)_n$-$D^2$-, respectively, is monosulfophenyl, disulfophenyl, disulfonaphth-2-yl or trisulfonapth-2-yl, very particular preference being given in turn to 2-sulfophenyl, 2,5-disulfophenyl, 2,4-disulfophenyl, 4,8-disulfonaphth-2-yl, 6,8-disulfonaphth-2-yl, 5,7-disulfonaphth-2-yl, 3,6,8-trisulfonaphth-2-yl and 4,6,8-trisulfonaphth-2-yl.

Very particularly preferred dye mixtures of the invention comprise dyes of the general formula (I) and (II) in which $(MO_3S)_m$-$D^1$- and $(MO^3S)_n$-$D^2$- independently of one another are 4,8-disulfonaphth-2-yl, 6,8-disulfonaphth-2-yl, 5,7-disulfonaphth-2-yl, 3,6,8-trisulfonaphth-2-yl or 4,6,8-trisulfonaphth-2-yl;

$W^1$ and $W^2$ independently of one another are ethylene, —(CH$_2$)$_2$—O—(CH$_2$)$_2$— or phenylene;

$Y^1$ and $Y^2$ independently of one another are vinyl or β-sulfatoethyl;

$R^1$ and $R^4$ are hydrogen;

$R^2$ and $R^5$ independently of one another are methyl or amino;

$R^3$ and $R^6$ independently of one another are hydrogen, methyl or phenyl; and M is hydrogen or sodium, and, if $W^1$ or $W^2$ is phenylene, the group —SO$_2$Y$^1$ or —SO$^2$Y$^2$ respectively is positioned para or meta to the group —NR$^3$— or —NR$^6$—, respectively.

In the dye mixtures of the invention the dyes of the general formula (I) and (II) are preferably in a molar ratio of dye of general formula (I) to dye of general formula (II) of 70:30 to 30:70, the ratio 60:40 to 40:60 being particularly preferred.

The compounds of the general formula (I) and (II) may have the same structure except for a difference in terms of the fiber-reactive groups —SO$_2$Y$^1$ or —SO$_2$Y$^2$ or —SO$_2$Y$^3$, respectively. In particular, —SO$_2$Y$^1$ or —SO$_2$Y$_2$ or —SO$^2$Y$^3$ may be —SO$_2$CH=CH$_2$ on the one hand and —SO$_2$CH$_2$CH$_2$Z on the other, with particular preference β-sulfatoethylsulfonyl. The fraction of dye in the vinylsulfonyl form can be up to about 30 mol %, based on the particular dye chromophore. Preferably the fraction of vinylsulfonyl dye to β-ethyl-substituted dye is in a molar ratio between 5:95 and 30:70.

The dye mixtures of the invention may be present as a preparation in solid or in liquid (dissolved) form. In solid form they include, where necessary, the electrolyte salts which are customary for water-soluble and especially fiber-reactive dyes, such as sodium chloride, potassium chloride and sodium sulfate, and may further include the auxiliaries customary in commercial dyes, such as buffer substances capable of setting a pH in aqueous solution of between 3 and 7, such as sodium acetate, sodium citrate, sodium borate, sodium hydrogen carbonate, sodium dihydrogenphosphate and disodium hydrogenphosphate, and also dyeing assistants, dedusting agents and small amounts of siccatives. If they are present in liquid, aqueous solution (including the presence of thickeners of the type customary in printing pastes) they may also include substances which prolong the shelf life of these preparations, such as mold preventatives.

In solid form the dye mixtures of the invention are generally in the form of granules or powders containing electrolyte salt (referred to in general below as a preparation) with one or more of the abovementioned auxiliaries where appropriate.

The preparations contain the dye mixture at 20% to 90% by weight, based on the preparation. The buffer substances are generally present in a total amount of up to 5% by weight, based on the preparation. Where the dye mixtures of the invention are in aqueous solution the total dye content of these aqueous solutions is up to about 50% by weight, such as between 5% and 50% by weight, for example, the electrolyte salt content of these aqueous solutions being preferably below 10% by weight, based on the aqueous solution. The aqueous solutions (liquid preparations) may include the aforementioned buffer substances in general in an amount of up to 5% by weight, preferably up to 2% by weight.

The dye mixtures of the invention can be prepared by processes which are conventional per se; for example, by mechanically mixing the individual dyes of the general formulae (I) and (II), whether in the form of dye powders or dye granules or of synthesis solutions of the dyes of the general formulae (I) and (II) or of aqueous solutions of the dyes of the general formulae (I) and (II) in general, which may also include customary auxiliaries.

The dye mixtures of the invention may comprise further fiber-reactive dyes which serve to shade the dye mixture, in an amount of up to 5% by weight. These "shading dyes" can be added by conventional mixing or else can be prepared by chemical means in the same reaction mixture together with the synthesis of a dye mixture of the invention and introduced into the dye mixture if one or more precursors of the shading dye is or are identical with one or more precursors of the dyes of the general formula (I) and/or (II).

The dyes of the general formulae (I) and (II) are known and are described for example in EP 0 021 105 A1, EP 0 056 975 A2 or DE 29 27 102 A1.

They are available on the market or can be prepared by known processes.

The present invention also provides for the use of the dye mixtures of the invention for dyeing or printing hydroxyl- and/or carboxamide-containing materials and a process for dyeing or printing a hydroxyl- and/or carboxamido-containing material which involves applying a dye mixture to the material and fixing the dye mixture on the material by means of heat and/or an alkali and which comprises using a dye mixture of the invention. This gives yellow dyeings or prints, respectively.

Hydroxyl-containing materials may be of natural or synthetic origin. Examples are cellulose fiber materials, such as preferably cotton, linen, hemp, jute and ramie fibers, regenerated products, such as preferably staple viscose and filament viscose, chemically modified cellulose fibers, such as aminated cellulose fibers, for example, and also polyvinyl alcohols.

Carboxamido-containing materials are for example synthetic and natural polyamides and polyurethanes, examples being wool and other animal hairs, silk, leather, nylon-6,6, nylon-6, nylon-11 and nylon-4.

The aforementioned hydroxyl- and/or carboxamido-containing materials can be in a variety of forms: for example, in the form of sheetlike structures, such as paper and leather, in the form of films, such as polyamide films, or in the form of a composition, composed for example of polyamide and polyurethane, but in particular in the form of fibers, such as cellulose fibers, for example. The fibers are preferably textile fibers, in the form for example of wovens or yarns or in the form of hanks or wound packages.

The dye mixtures of the invention can be applied to and fixed on the aforementioned materials, particularly on the aforementioned fiber materials, by the application techniques known for water-soluble dyes and particularly for fiber-reactive dyes.

For instance, on cellulose fibers, by the exhaust method, from a long liquor and also from a short liquor, for example, in a liquor to goods ratio of 5:1 to 100:1, preferably 6:1 to 30:1, using any of a wide variety of acid-binding agents and, where necessary, neutral salts, such as sodium chloride or sodium sulfate, they afford dyeings having very good color yields. Dyeing is preferably from an aqueous bath at temperatures between 40 and 105° C., where appropriate at a temperature up to 130° C. under superatmospheric pressure, but preferably at 30 to 95° C., in particular 45 to 65° C., in particular 45 to 65° C., and in the presence or absence of customary dyehouse assistants.

One possible procedure here is to introduce the material into the warm bath and to gradually heat the bath to the desired dyeing temperature and to complete the dyeing operation at that temperature. The neutral salts that accelerate the exhaustion of the dyes may also, if desired, be added to the bath only after the actual dyeing temperature has been reached.

Padding processes likewise produce excellent color yields and a very good color build-up on cellulose fibers, the dyes being fixable in conventional manner by batching at room temperature or elevated temperature, up to about 60° C. for example, or in a continuous dyeing manner, by means for example of a pad-dry-pad-steam process, by steaming or using dry heat.

Additionally with the dye mixtures of the invention, according to the customary printing processes for cellulose fibers, which can be carried out in one step, by printing for example with a print paste comprising sodium bicarbonate or another acid-binding agent and subsequently steaming at 100 to 103° C., or in two steps, by printing for example with a neutral or weakly acidic printing ink and subsequently fixing either by passing the printed material through a hot, electrolyte-containing alkaline bath or by overpadding it with an alkaline, electrolyte-containing padding liquor and subsequently batching or steaming or dry-heat-treating the alkali-overpadded material, strongly colored prints with well-defined contours and a clear white ground are produced. The outcome of the prints is little affected by variations in fixing conditions.

When fixing by means of dry heat in accordance with the customary thermofix processes hot air at 120 to 200° C. is used. In addition to the customary steam at 101 to 103° C. it is also possible to use superheated steam and high-pressure steam at temperatures of up to 160° C.

The agents which bind acid and which effect the fixation of the dyes of the dye mixtures of the invention on the cellulose fibers are, for example, water-soluble basic salts of alkali metals and likewise alkaline earth metals of organic or inorganic acids or compounds which liberate alkali under hot conditions, and also alkali metal silicates. Particular mention may be made of the alkali metal hydroxides and alkali metal salts of weak to medium-strength organic or inorganic acids, the alkali metal compounds being preferably the sodium and potassium compounds. Such acid-binding agents are for example sodium hydroxide, potassium hydroxide, sodium carbonate, sodium bicarbonate, potassium carbonate, sodium formate, sodium dihydrogen phosphate, disodium hydrogen phosphate, sodium trichloroacetate, trisodium phosphate or waterglass or mixtures thereof, such as mixtures of sodium hydroxide solution and waterglass, for example.

When employed in the dyeing and printing processes the dye mixtures of the invention are distinguished on the cellulose fiber materials by an outstanding color strength, which in some cases can be achieved even in the presence of only a very small amount, if any, of alkali metal compounds or alkaline earth metal compounds. In these specific cases, for example, no electrolyte salt is required for a low depth of color, not more than 5 g/l of electrolyte salt for a medium depth of color, and not more than 10 g/l of electrolyte salt for high depths of color.

A low depth of color in this context refers to the use of 2% by weight of dye, based on the substrate to be dyed; a medium depth of color refers to the use of 2% to 4% by weight of dye, based on the substrate to be dyed; and a high depth of color refers to the use of 4% to 10% by weight of dye, based on the substrate to be dyed.

The dyeings and prints obtainable with the dye mixtures of the invention possess clear shades and on cellulose fiber materials exhibit good light fastness and, in particular, good wet fastness properties, such as wash fastness, milling fastness, water fastness, saltwater fastness, cross-dyeing fastness and acidic and alkaline perspiration fastnesses. In addition they exhibit good fastness to pleating, hot pressing and rubbing. The very good chlorine fastness, however, deserves particular emphasis.

The dye mixtures of the invention can also be used, furthermore, for the fiber-reactive dyeing of wool. This includes wool which has been given a nonfelting or low-felting finish (cf. for example H. Rath, Lehrbuch der Textilchemie, Springer-Verlag, 3rd edition (1972), pp. 295-299, particularly wool finished by the Hercosett process (p. 298); J. Soc. Dyers and Colourists 1972, 93-99, and 1975, 33-44). Dyeing on wool takes place in conventional manner from an acidic medium. For instance, acetic acid and/or ammonium sulfate or acetic acid and ammonium acetate or sodium acetate, for example, can be added to the dyebath in order to give the desired pH. To achieve a practicable levelness in the dyeing it is advisable to add customary leveling assistants, such as those based for example on a reaction product of cyanuric chloride with three times the molar amount of an aminobenzenesulfonic acid and/or an aminonaphthalene-sulfonic acid or based on a reaction product of, for example stearylamine with ethylene oxide.

Thus, for example, the dye mixture of the invention is preferably subjected first to the exhaust operation from an acidic dyebath having a pH of about 3.5 to 5.5, and a pH control, and then toward the end of the dyeing time the pH is shifted into the neutral and, where appropriate, weakly alkaline range up to a pH of 8.5, in order to bring about, especially for very deep dyeings, the full reactive bond between the dyes of the dye mixtures of the invention and the fiber. At the same time the fraction of dye not reactively bound is detached.

The procedure described here also applies to the production of dyeings on fiber materials composed of other natural polyamides or of synthetic polyamides and polyurethanes. In general the material to be dyed is introduced into the bath at a temperature of about 40° C., agitated therein for a certain time, the dyebath is then adjusted to the desired weakly acidic, preferably weakly acetic acid, pH and the actual dyeing is carried out at a temperature between 60 and 98° C. Alternatively the dyeings can be performed at boiling temperature or, in closed dyeing apparatus, at temperatures of up to 106° C. Since the water solubility of the dye mixtures of the invention is very good they can also be used with advantage in customary continuous dyeing processes.

The dye mixtures of the invention can also be used in digital printing processes, particularly in digital textile printing. For that purpose it is necessary to formulate the dye mixtures of the invention in inks. Aqueous inks for digital printing which characteristically comprise a dye mixture of the invention are likewise provided by the present invention.

The inks of the invention contain the dye mixture of the invention preferably in amounts from 0.1% to 50% by weight, more preferably in amounts from 1% to 30% by weight and very preferably in amounts from 1% to 15% by weight, based on the total weight of the ink.

In addition to the dye mixture of the invention the inks may include, where desired, further reactive dyes which are used in digital printing.

For the use of the inks of the invention in a continuous flow process electrolyte can be added to set a conductivity of 0.5 to 25 mS/m. Examples of suitable electrolyte include lithium nitrate and potassium nitrate.

The inks of the invention may include organic solvents with a total content of 1-50%, preferably of 5-30% by weight. Examples of suitable organic solvents are alcohols, such as methanol, ethanol, 1-propanol, isopropanol, 1-butanol, tert-butanol and pentyl alcohol; for example; polyhydric alcohols, such as 1,2-ethanediol, 1,2,3-propanetriol, butanediol, 1,3-butanediol, 1,4-butanediol, 1,2-propanediol, 2,3-propanediol, pentanediol, 1,4-pentanediol, 1,5-pentanediol, hexanediol, D,L-1,2-hexanediol, 1,6-hexanediol, 1,2,6-hexanetriol and 1,2-octanediol, for example; polyalkylene glycols, such as polyethylene glycol and polypropylene glycol, for example; alkylene glycols having 1 to 8 alkylene groups, such as monoethylene glycol, diethylene glycol, triethylene glycol, tetraethylene glycol, thioglycol, thiodiglycol, butyltriglycol, hexylene glycol, propylene glycol, dipropylene glycol and tripropylene glycol; for example; lower alkyl ethers of polyhydric alcohols, such as ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, diethylene glycol monohexyl ether, triethylene glycol monomethyl ether, triethylene glycol monobutyl ether, tripropylene glycol monomethyl ether, tetraethylene glycol monomethyl ether, tetraethylene glycol monobutyl ether, tetraethylene glycol dimethyl ether, propylene glycol monomethyl ether, propylene glycol monoethyl ether, propylene glycol monobutyl ether and tripropylene glycol isopropyl ether, for example; polyalkylene glycol ethers, such as polyethylene glycol monomethyl ether, polypropylene glycol glycerol ether, polyethylene glycol tridecyl ether and polyethylene glycol nonylphenyl ether, for example; amines, such as methylamine, ethylamine, triethylamine, diethylamine, dimethylamine, trimethylamine, dibutylamine, diethanolamine, triethanolamine, N-acetylethanolamine, N-formylethanolamine and ethylenediamine, for example; urea derivatives, such as urea, thiourea, N-methylurea, N,N'-epsilon-dimethylurea, ethyleneurea and 1,1,3,3-tetramethylurea, for example; amides, such as dimethylformamide, dimethylacetamide and acetamide, for example; ketones or keto alcohols, such as acetone and diacetone alcohol, for example; cyclic ethers, such as tetrahydrofuran, trimethylolethane, trimethylolpropane, 2-butoxyethanol, benzyl alcohol, 2-butoxyethanol, gamma-butyrolactone, epsilon-caprolactam, for example; additionally sulfolane, dimethylsulfolane, methylsulfolane, 2,4-dimethylsulfolane, dimethyl sulfone, butadiene sulfone, dimethyl sulfoxide, dibutyl sulfoxide, N-cyclohexylpyrrolidone, N-methyl-2-pyrrolidone, N-ethylpyrrolidone, 2-pyrrolidone, 1-(2-hydroxy-ethyl)-2-pyrrolidone, 1-(3-hydroxypropyl)-2-pyrrolidone, 1,3-dimethyl-2-imidazolidinone, 1,3-dimethyl-2-imidazolinone, 1,3-bismethoxymethyl-imidazolidine, 2-(2-methoxyethoxy)ethanol, 2-(2-ethoxyethoxy)ethanol, 2-(2-butoxyethoxy)ethanol, 2-(2-propoxyethoxy)ethanol, pyridine, piperidine, butyrolactone, trimethylpropane, 1,2-dimethoxypropane, dioxane, ethyl acetate, ethylenediaminetetraacetate, ethyl pentyl ether, 1,2-dimethoxypropane and trimethylpropane.

The inks of the invention may further include the customary additives, such as, for example, viscosity moderators to set viscosities in the range from 1.5 to 40.0 mPa.s in a temperature range from 20 to 50° C. Preferred inks have a viscosity of 1.5 to 20 mPas and particularly preferred inks a viscosity of 1.5 to 15 mPas.

Useful viscosity moderators include rheological additives, examples being the following: polyvinylcaprolactam, polyvinylpyrrolidone and their copolymers, polyether polyol, associative thickener, polyurea, polyurethane, sodium alginates, modified galactomannans, polyetherurea, polyurethane, and nonionic cellulose ethers.

As further additions the inks of the invention may include surface-active substances to set surface tensions of 20 to 65 mN/m, which are adapted where appropriate as a function of the process used (thermal or piezo technology). Useful surface-active substances include, for example, surfactants of all kinds, preferably nonionic surfactants, butyl diglycol and 1,2-hexanediol.

The inks of the invention may further include customary additions, such as substances for preventing fungal and bacterial growth, for example, in amounts of 0.01% to 1% by weight, based on the total weight of the ink.

The inks may be prepared in a conventional manner by mixing the components in water.

The inks of the invention are especially useful for use in inkjet printing processes for printing a wide variety of pretreated materials, such as silk, leather, wool, polyamide fibers and polyurethanes, and especially cellulosic fiber materials of any kind. Blend fabrics as well can be printed, examples being blends of cotton, silk or wool with polyester fibers or polyamide fibers.

In contrast to conventional textile printing, where the printing ink already contains all the fixing chemicals and thickeners for a reactive dye, in digital printing or inkjet printing the assistants have to be applied to the textile substrate in a separate pretreatment step.

The pretreatment of the textile substrate, such as cellulose fibers and regenerated cellulose fibers, and also silk and wool, for example, takes place prior to printing, using an aqueous alkaline liquor. The fixing of reactive dyes requires alkali, such as sodium carbonate, sodium bicarbonate, sodium acetate, trisodium phosphate, sodium silicate or sodium hydroxide, alkali donors such as, for example, sodium chloroacetate or sodium formate, hydrotropic substances such as, for example, urea, reduction inhibitors, such as, for example, sodium nitrobenzenesulfonates, and also thickeners to prevent the motifs flowing when the printing ink is applied. The latter are, for example, sodium alginates, modified polyacrylates or highly etherified galactomannans.

These pretreatment reagents are applied uniformly to the textile substrate in a defined amount using suitable applicators, examples being a 2- or 3-roll padder, using contactless spraying technologies, by means of foam application, or using appropriately adapted inkjet technologies, and are subsequently dried.

Printing is followed by drying of the textile fiber material at 120 to 150° C. and then by fixing.

The fixing of the inkjet prints prepared with reactive dyes can be carried out at room temperature or with saturated steam, with superheated steam, with hot air, with microwaves, with infrared radiation, with laser or electron beams or with other suitable energy transfer techniques.

A distinction is made between one- and two-phase fixing operations. In one-phase fixing the necessary fixing chemicals are already on the textile substrate. In the case of two-phase fixing this pretreatment is unnecessary. Fixing requires only alkali, which is applied following inkjet printing and before the fixing operation, without drying in between. There is no need for further additions such as urea or thickener.

Fixing is followed by print aftertreatment, which is the prerequisite for good fastnesses, high brilliance and an immaculate white ground.

The prints prepared with the inks of the invention, especially on cellulose fiber materials, possess high color strength and a high fiber-dye bond stability not only in the acidic but also in the alkaline range, and also possess good light fastness and very good wet fastness properties, such as fastness to washing, water, saltwater, cross-dyeing and perspiration, and also good fastness to heat setting and pleating, and crockfastness.

The examples which follow serve to illustrate the invention. Parts and percentages are by weight unless noted otherwise. The relationship of parts by weight to parts by volume is that of the kilogram to the liter. The compounds described by formula in the examples are written in the form of the sodium salts, since they are generally prepared and isolated in the form of their salts, preferably sodium or potassium salts, and are used in the form of their salts for coloring. The starting compounds specified in the examples below can be used for synthesis in the form of the free acid or likewise in the form of their salts, preferably alkali metal salts, such as sodium or potassium salts; in other words, M is as defined above.

EXAMPLE 1

1000 parts of an aqueous solution coming directly from dye synthesis and containing 180 parts of the dye of the formula (Ia)

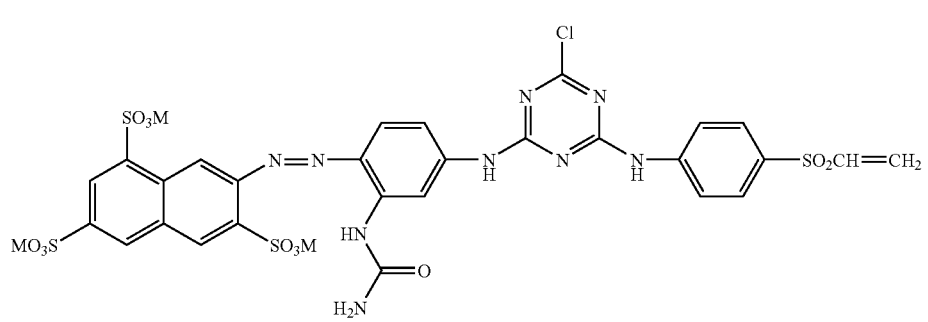

and 1000 parts of an aqueous solution coming directly from dye synthesis and containing 180 parts of the dye of the formula (IIa)

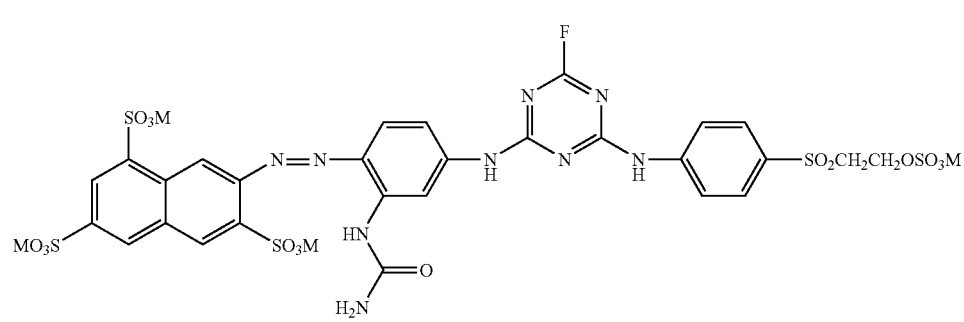

are mixed with one another. Isolated from the combined solution in a customary manner, such as by spray drying, for example, is a dye mixture having a molar ratio of dye (Ia) to dye (IIa) of 53:47. The mixture includes electrolyte salts, such as sodium chloride and sodium sulfate, which originate from the respective dye synthesis, and exhibits very good dyeing properties. For example, on cellulosic fiber materials, such as cotton, or regenerated cellulose fibers, in an exhaust dyeing process customary for fiber-reactive dyes, it gives level, strongly colored yellow dyeings which possess good chlorine fastness.

EXAMPLE 2

800 parts of an aqueous solution coming directly from dye synthesis and containing 100 parts of the dye of the formula (1b)

and 500 parts of an aqueous solution containing 70 parts of the dye of the formula (IIa) are mixed with one another. Isolated from the combined solution in a customary manner, such as by spray drying, for example, is a dye mixture having a molar ratio of dye (Ic) to dye (IIa) of 52:48. The mixture includes electrolyte salts, such as sodium chloride and sodium sulfate which originate from the respective dye synthesis, and exhibits very good dyeing properties. For example, on cellulosic fiber materials, such as cotton, or

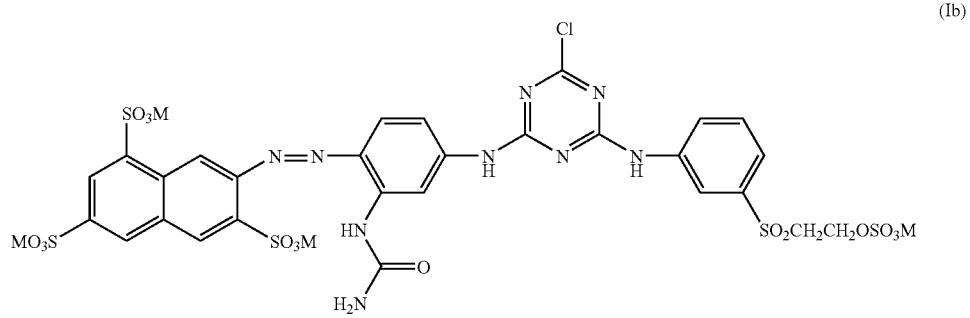

(Ib)

and 1000 parts of an aqueous solution coming directly from dye synthesis and containing 98.4 parts of the dye of the formula (IIa) are mixed with one another. Isolated from the combined solution in a customary manner, such as by spray drying, for example, is a dye mixture having a molar ratio of dye (Ib) to dye (IIa) of 50:50. The mixture includes electrolyte salts, such as sodium chloride and sodium sulfate, which originate from the respective dye synthesis, and exhibits very good dyeing properties. For example, on cellulosic fiber materials, such as cotton, or regenerated cellulose fibers, in a cold pad batch process customary for fiber-reactive dyes, it gives level, strongly colored yellow dyeings which possess good chlorine fastness.

EXAMPLE 3

500 parts of an aqueous solution containing 70 parts of the below-indicated dye formula (1c)

regenerated cellulose fibers, in an exhaust dyeing process customary for fiber-reactive dyes, it gives level, strongly colored yellow dyeings which possess good chlorine fastness.

EXAMPLES 4 TO 26

The examples below concern further dye mixtures of the invention which exhibit very good performance properties and on the materials referred to in the description, such as cellulose fiber materials in particular, using the application methods that are customary in the art in the dye house and print house, preferably using the application methods and fixing methods that are customary in the art for fiber-reactive dyes, give strongly colored yellow dyeings and prints having good fastness properties and good color build-up

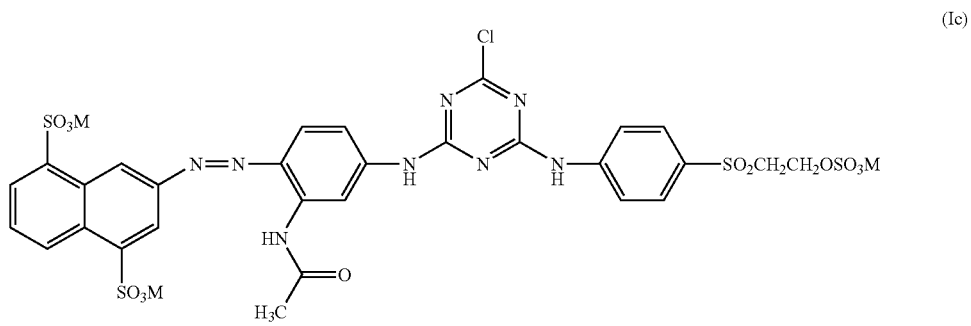

(Ic)

| Example | Dye (1) | Dye (2) | Molar ratio Dye (1):Dye (2) |
|---|---|---|---|
| 4 | formula (Id) | formula (IIa) | 52:48 |
| 5 | formula (Ie) | formula (IIa) | 50:50 |
| 6 | formula (Ia) | formula (IIc) | 49:51 |
| 7 | formula (Ia) | formula (IId) | 50:50 |
| 8 | formula (Ib) | formula (IIb) | 50:50 |
| 9 | formula (Ib) | formula (IIc) | 46:54 |
| 10 | formula (Ib) | formula (IId) | 47:53 |
| 11 | formula (Ic) | formula (IIb) | 52:48 |
| 12 | formula (Ic) | formula (IId) | 50:50 |
| 13 | formula (Id) | formula (IIb) | 52:48 |
| 14 | formula (Id) | formula (IId) | 49:51 |
| 15 | formula (Id) | formula (IIe) | 50:50 |
| 16 | formula (Ie) | formula (IIb) | 50:50 |
| 17 | formula (Ie) | formula (IIc) | 46:54 |
| 18 | formula (Ie) | formula (IId) | 47:53 |
| 19 | formula (Ie) | formula (IIe) | 47:53 |
| 20 | formula (If) | formula (IIa) | 52:48 |
| 21 | formula (Ia) | formula (IIf) | 50:50 |
| 22 | formula (Ia) | formula (IIg) | 52:48 |
| 23 | formula (Ib) | formula (IIh) | 50:50 |
| 24 | formula (Ia) | formula (IIi) | 46:54 |
| 25 | formula (Ib) | formula (IIi) | 43:57 |
| 26 | formula (Ic) | formula (IIi) | 46:54 |

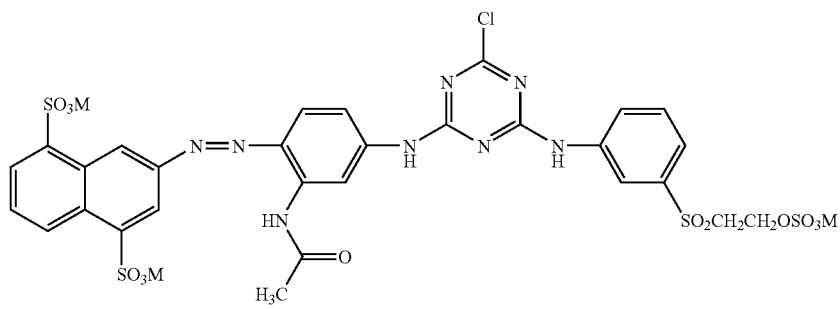

(Id)

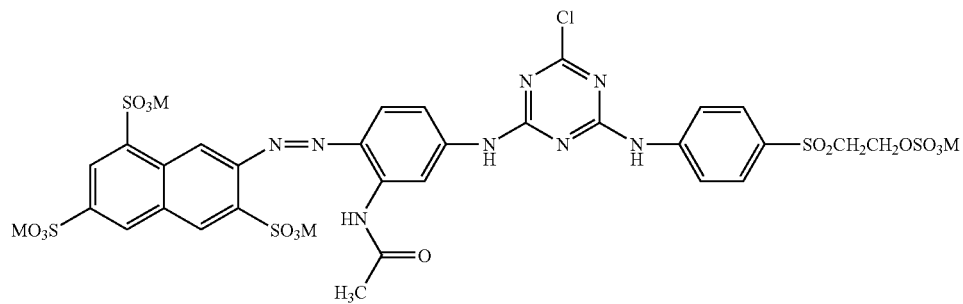

(Ie)

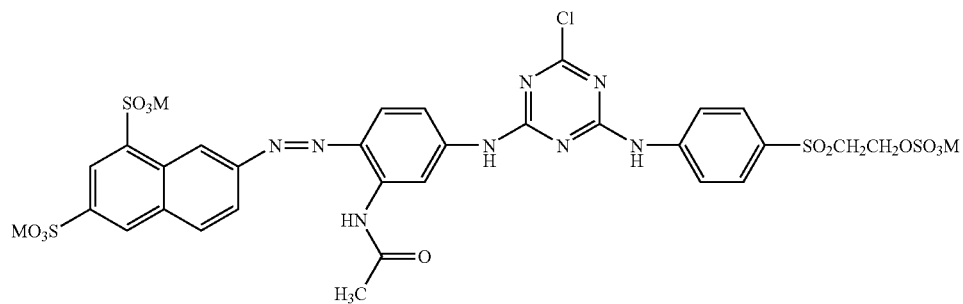

(If)

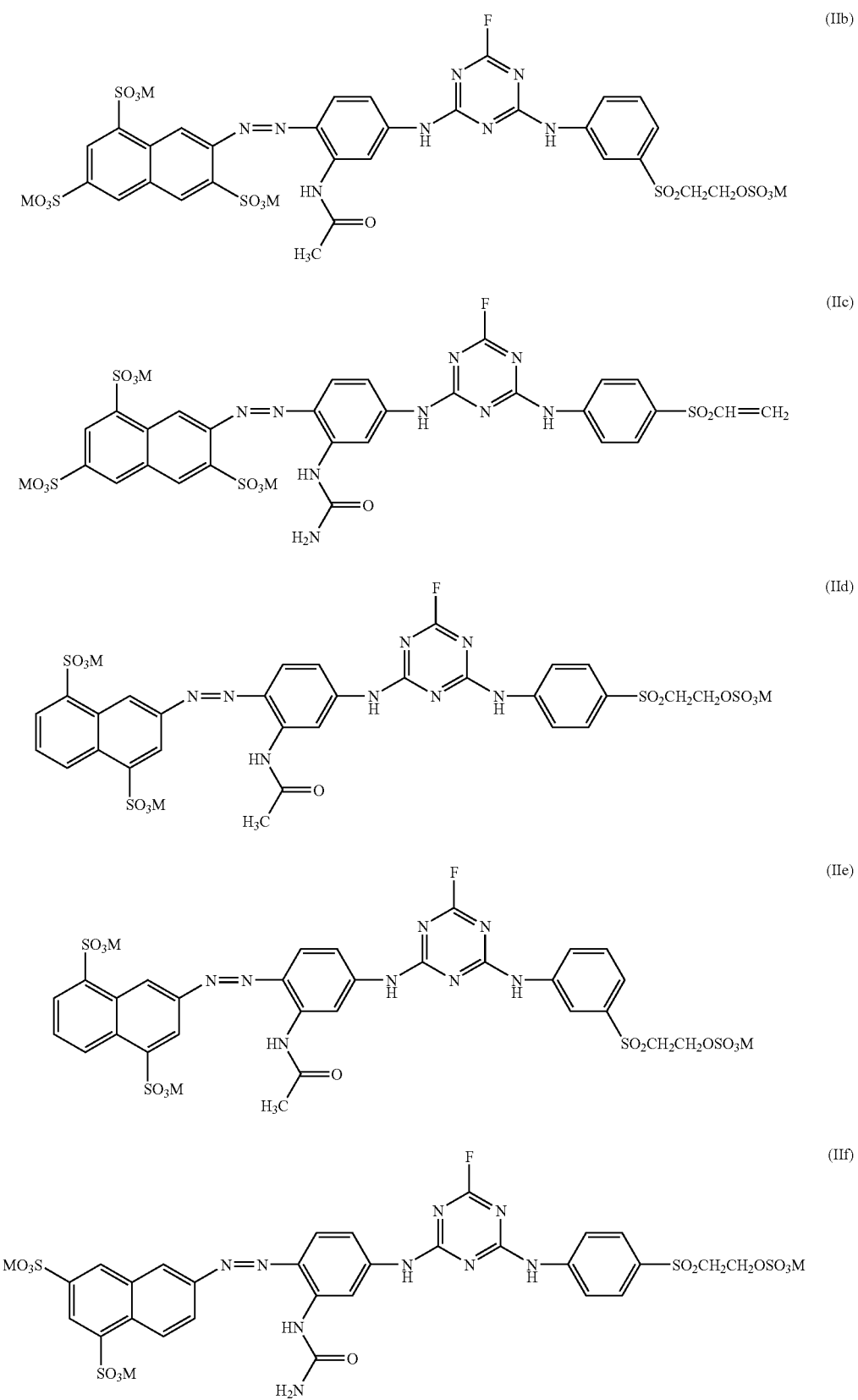

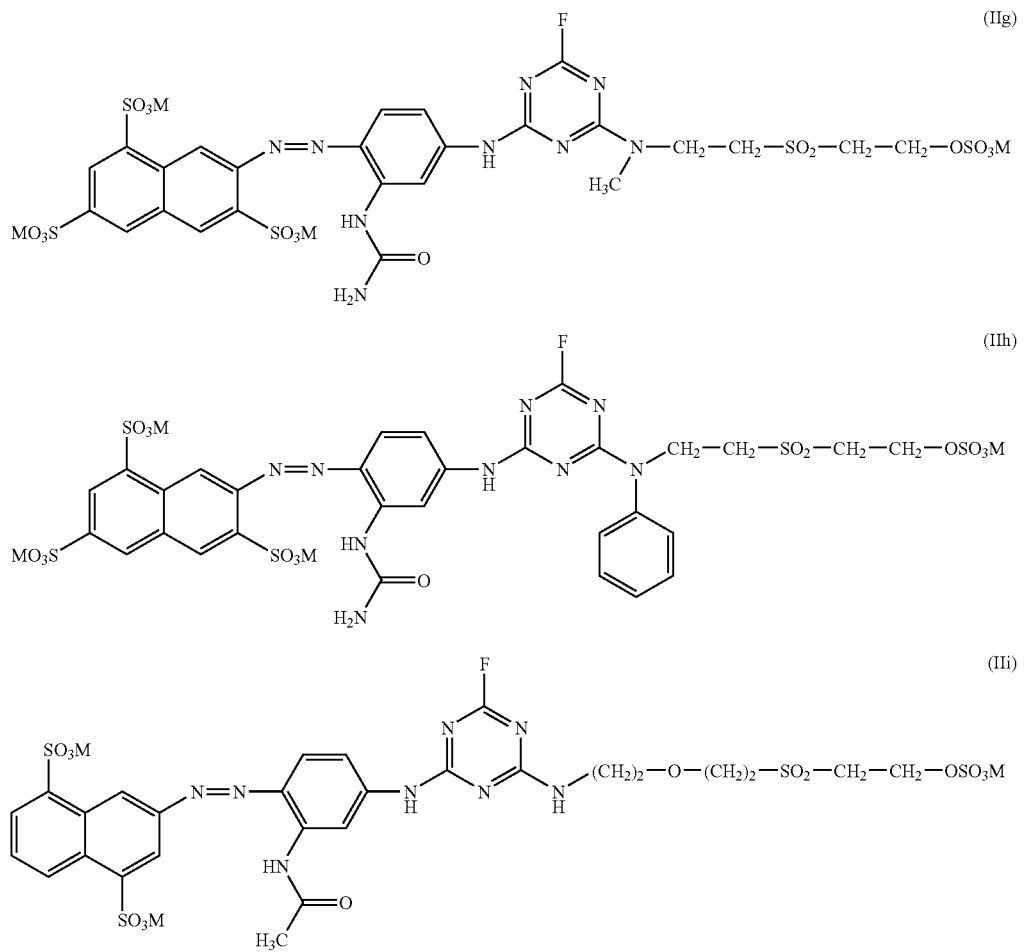

EXAMPLE 27

A textile fabric consisting of mercerized cotton is padded with a liquor containing 35 g/l of calcined sodium carbonate, 100 g/l of urea and 150 g/l of a low-viscosity sodium alginate solution (6%) and then dried. The liquor pickup is 70%. The textile thus pretreated is printed with a pattern using an aqueous ink containing 2% of the dye mixture according to example 1, 20% of sulfolane, 0.01% of Mergal K9N and 77.99% of water, and using a drop-on-demand (bubble jet) inkjet printing head. The print is fully dried. Fixing takes place by means of saturated steam at 102° C. for 8 minutes. Thereafter the print is rinsed warm, subjected to a fastness wash with hot water at 95° C., rinsed warm and then dried. This gives a yellow print having an outstanding durability.

EXAMPLE 28

A textile fabric consisting of mercerized cotton is padded with a liquor containing 35 g/l of calcined sodium carbonate, 50 g/l of urea and 150 g/l of a low-viscosity sodium alginate solution (6%) and then dried. The liquor pickup is 70%. The textile thus pretreated is printed with a pattern using an aqueous ink containing 8% of the dye mixture according to example 2, 20% of 1,2-propanediol, 0.01% of Mergal K9N and 71.99% of water, and using a drop-on-demand (bubble jet) inkjet printing head. The print is fully dried. Fixing takes place by means of saturated steam at 102° C. for 8 minutes. Thereafter the print is rinsed warm, subjected to a fastness wash with hot water at 95° C., rinsed warm and then dried. This gives a yellow print having an outstanding durability.

EXAMPLE 29

A textile fabric consisting of mercerized cotton is padded with a liquor containing 35 g/l of calcined sodium carbonate, 100 g/l of urea and 150 g/l of a low-viscosity sodium alginate solution (6%) and then dried. The liquor pickup is 70%. The textile thus pretreated is printed with a pattern using an aqueous ink containing 8% of the dye mixture according to example 3, 15% of N-methylpyrrolidone, 0.01% of Mergal K9N and 76.99% of water, and using a drop-on-demand (bubble jet) inkjet printing head. The print is fully dried. Fixing takes place by means of saturated steam at 102° C. for 8 minutes. Thereafter the print is rinsed warm, subjected to a fastness wash with hot water at 95° C., rinsed warm and then dried. This gives a yellow print having an outstanding durability.

What is claimed is:

1. A dye mixture which comprises at least one dye of the general formula (I)

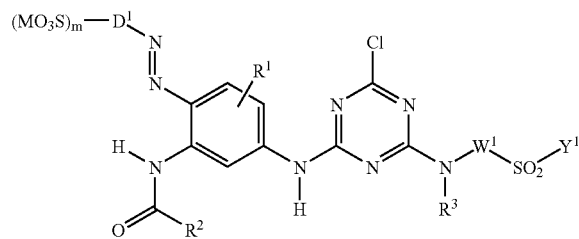

and at least one dye of the general formula (II)

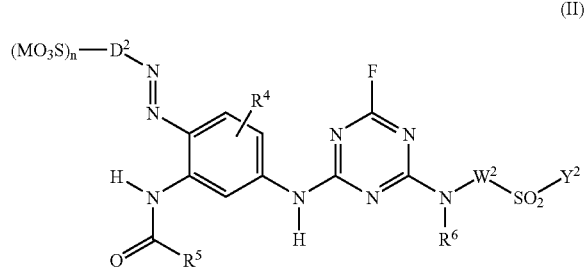

in which
- $D^1$ and $D^2$ independently of one another are the radical of benzene or of naphthalene;
- m and n independently of one another are the number 1, 2 or 3;
- $W^1$ and $W^2$ independently of one another are $(C_1\text{-}C_4)$-alkylene, $(C_3\text{-}C_6)$-alkylene which is interrupted by 1 or 2 hetero-groups from the group of formulae —O— and —NH—, or are a group alk-phen, phen-alk or phen, in which alk is methylene, ethylene or n-propylene and phen is phenylene or phenylene substituted by 1 or 2 substituents from the group sulfo, $(C_1\text{-}C_4)$-alkyl and $(C_1\text{-}C_4)$-alkoxy;
- $Y^1$ and $Y^2$ independently of one another are vinyl or ethyl substituted in β position by an alkali-eliminable substituent;
- $R^1$ and $R^4$ independently of one another are hydrogen, $(C_1\text{-}C_4)$-alkyl and $(C_1\text{-}C_4)$-alkoxy or sulfo;
- $R^2$ and $R^5$ independently of one another are amino, $(C_1\text{-}C_4)$-alkyl or $(C_1\text{-}C_4)$-alkyl substituted by carboxyl, sulfo or a group —$SO_2$—$Y^3$ in which $Y^3$ has one of the definitions stated for $Y^1$;
- $R^3$ and $R^6$ independently of one another are hydrogen, $(C_1\text{-}C_4)$-alkyl phenyl or phenyl substituted by 1 or 2 substituents from the group sulfo, $(C_1\text{-}C_4)$-alkyl and $(C_1\text{-}C_4)$-alkoxy; and
- M is hydrogen, an alkali metal or the equivalent of an alkaline earth metal.

2. A dye mixture as claimed in claim 1, wherein
- $D^1$ and $D^2$ independently of one another are the radical of benzene or of naphthalene;
- m and n independently of one another are the number 1, 2 or 3;
- $W^1$ and $W^2$ independently of one another are ethylene, n-propylene, —$(CH_2)_2$—O—$(CH_2)_2$—, —$CH_2$-phenylene, —$CH_2\text{-}CH_2$-phenylene, phenylene-$CH_2$—, phenylene-$CH_2\text{-}CH_2$, phenylene or phenylene substituted by 1 or 2 substituents from the group sulfo, methyl, ethyl, methoxy and ethoxy;
- $Y^1$ and $Y^2$ independently of one another are vinyl, β-chloroethyl or β-sulfatoethyl;
- $R^1$ and $R^4$ independently of one another are hydrogen, methyl, methoxy or sulfo and are positioned para to the group —NH—CO—$R^2$ or —NH—CO—$R^5$, respectively;
- $R^2$ and $R^5$ independently of one another are methyl or amino;
- $R^3$ and $R^6$ independently of one another are hydrogen, $(C_1\text{-}C_4)$-alkyl or phenyl; and
- M is hydrogen, sodium, potassium or lithium.

3. A dye mixture as claimed in claim 1, wherein the groups $(MO_3S)_m$—$D^1$—and $(MO_3S)_n$—$D^2$—independently of one another are monosulfophenyl, disulfophenyl, disulfonaphth-2-yl or trisulfonapth-2-yl.

4. A dye mixture as claimed in claim 3, wherein the groups $(MO_3S)_m$—$D^1$—and $(MO_3S)_n$—$D^2$—independently of one another are 2-sulfophenyl, 2,5-disulfophenyl, 2,4-disulfophenyl, 4,8-disulfonaphth-2-yl, 6,8-disulfonaphth-2-yl, 5,7-disulfonaphth-2-yl, 3,6,8-trisulfonaphth-2-yl or 4,6,8-trisulfonaphth-2-yl.

5. A dye mixture as claimed in claim 1, wherein
- $(MO_3S)_m$—$D^1$—and $(MO_3S)_n$—$D^2$-independently of one another are 4,8-disulfonaphth-2-yl, 6,8-disulfonaphth-2-yl, 5,7-disulfonaphth-2-yl, 3,6,8-trisulfonaphth-2-yl or 4,6,8-trisulfonaphth-2-yl;
- $W^1$ and $W^2$ independently of one another are ethylene, —$(CH_2)_2$—O—$(CH_2)_2$—or phenylene;
- $Y^1$ and $Y^2$ independently of one another are vinyl or β-sulfatoethyl;
- $R^1$ and $R^4$ are hydrogen;
- $R^2$ and $R^5$ independently of one another are methyl or amino;
- $R^3$ and $R^6$ independently of one another are hydrogen, methyl or phenyl; and
- M is hydrogen or sodium,
- and, if $W^1$ or $W^2$ is phenylene, the group—$SO_2Y^1$ or—$SO_2Y^2$ respectively is positioned para or meta to the group —$NR^3$- or —$NR^6$-, respectively.

6. A dye mixture as claimed in claim 1, wherein the dyes of the general formula (I) and (II) are present in a molar ratio of dye of the general formula (I) to dye of the general formula (II) of 70:30 to 30:70.

7. A process for preparing a dye mixture as claimed in claim 1, which comprises mixing the individual dyes of the general formulae (I) and (II) mechanically.

8. An aqueous ink for digital printing, which comprises a dye mixture as claimed in claim 1.

9. A hydroxyl- and/or carboxamido-containing material which has been dyed or printed with a dye mixture as claimed in claim 1.

10. The dye mixture as claimed in claim 4, wherein
- $(MO_3S)_m$—$D^1$—and $(MO_3S)_n$—$D^2$—independently of one another are 4,8-disulfonaphth-2-yl, 6,8-disulfonaphth-2-yl, 5,7-disulfonaphth-2-yl, 3,6,8-trisulfonaphth-2-yl or 4,6,8-trisulfonaphth-2-yl;
- $W^1$ and $W^2$ independently of one another are ethylene, —$(CH_2)_2$—O—$(CH_2)_2$—or phenylene;
- $Y^1$ and $Y^2$ independently of one another are vinyl or β-sulfatoethyl;
- $R^1$ and $R^4$ are hydrogen;
- $R^2$ and $R^5$ independently of one another are methyl or amino;

R³ and R⁶ independently of one another are hydrogen, methyl or phenyl; and

M is hydrogen or sodium, and, if $W^1$ or $W^2$ is phenylene, the group —$SO_2Y^1$ or —$SO_2Y^2$ respectively is positioned para or meta to the group —$NR^3$— or —$NR^6$—, respectively.

11. The dye mixture as claimed in claim 10, wherein the groups $(MO_3S)_m$—$D^1$— and $(MO_3S)_n$—$D^2$— independently of one another are monosulfophenyl, disulfophenyl, disulfonaphth-2-yl or trisulfonapth-2-yl.

12. The dye mixture as claimed in claim 11, wherein the dyes of the general formula (I) and (II) are present in a molar ratio of dye of the general formula (I) to dye of the general formula (II) of 60:40 to 40:60.

13. A process for dyeing which comprises contacting a hydroxyl- and/or carboxamido-containing materials with the dye mixtures as claimed in claim 1.

* * * * *